Nov. 21, 1967     E. ROTTMAYER     3,354,458

WIRE-FILM SPACE SATELLITE

Filed May 20, 1966     2 Sheets-Sheet 1

INVENTOR
*EARL ROTTMAYER*
BY *A.H. Oldham*
ATTORNEY

United States Patent Office 3,354,458
Patented Nov. 21, 1967

3,354,458
WIRE-FILM SPACE SATELLITE
Earl Rottmayer, Tallmadge, Ohio, assignor to Goodyear Aerospace Corporation, Akron, Ohio, a corporation of Delaware
Filed May 20, 1966, Ser. No. 551,774
9 Claims. (Cl. 343—18)

ABSTRACT OF THE DISCLOSURE

A satellite having a wire mesh body adhesively secured to an inflating bladder which can be packaged compactly for transportation into space and can then be expanded to the desired deployed shape thereby stretching the wires adhesively secured to the bladder beyond their elastic limits to cold work the satellite to the desired shape wherein the shape can be a plurality of interconnected geometrical shapes with the elimination of any seams or heavy areas on the shapes because of the arrangement of the wire mesh.

This invention relates to a passive, space inflated and rigidized communication satellite, and the method employed to make the satellite. It is an improvement on the invention of application Serial No. 265,891, filed March 18, 1963, now Patent No. 3,224,000, by Frederick Bloetscher, James O. Gibson, and William B. Cross. Both applications are assigned to Goodyear Aerospace Corporation of Akron, Ohio.

Heretofore it has been known that the present echo type passive radar reflector satellites are not rigid when in space, and, therefore, do not give consistent reflective qualities. Additionally, echo type reflectors have been effected by solar pressure which greatly changes the orbital path of the satellite. Further, it has not heretofore been possible to fabricate cylindrically shaped reflectors, or to make a conically shaped reflector which, when the apex of the cone is pointed towards the earth, cannot be detected by earth based radar equipment because of dispersion of electromagnetic waves by the conical configuration of the satellite.

It is the general object of the invention to avoid and overcome the foregoing and other difficulties of and objections to prior art practices by the provisions of a rigid, lightweight, highly reflective satellite utilizing electrically reflective wires adhesively bonded or welded together to an inflatable bladder, and which is less effected by solar pressure.

Another object of the invention is to create a satellite having a wire mesh body and an inflating bladder which can be packaged compactly for transportation into space and which can then be expanded to the desired deployed shape thereby stretching the wires adhesively secured to the bladder beyond their elastic limits, but not to the breaking point.

Another object of the invention is to provide a satellite construction wherein the bladder used to form the satellite decomposes under the influence of the space environment leaving only the wire cage so that the satellite is little effected by solar pressure thereafter.

Still another object of the invention is to provide a satellite construction in a conical shape where the apex of the cone can be pointed towards the earth to in effect make the satellite non-detectable or transparent to earth based radar.

Still another object of the invention is to use an inflatable cylindrical shape as a structural element to form very large inflatable antenna designs in a space environment.

The aforesaid objects of the invention, and other objects which will become apparent as the description proceeds are achieved by providing a wire meshed reinforced bladder that is easily packaged in a space vehicle, which bladder when ejected into space expands under internal pressure to its designed shape and thereby stretches the wires of the mesh beyond their elastic limit to hold the desired satellite shape with no memory of the bladder, and in which the bladder then decomposes under the influence of the space environment.

For a better understanding of the invention reference should be had to the accompanying drawings, wherein.

Figure 1:
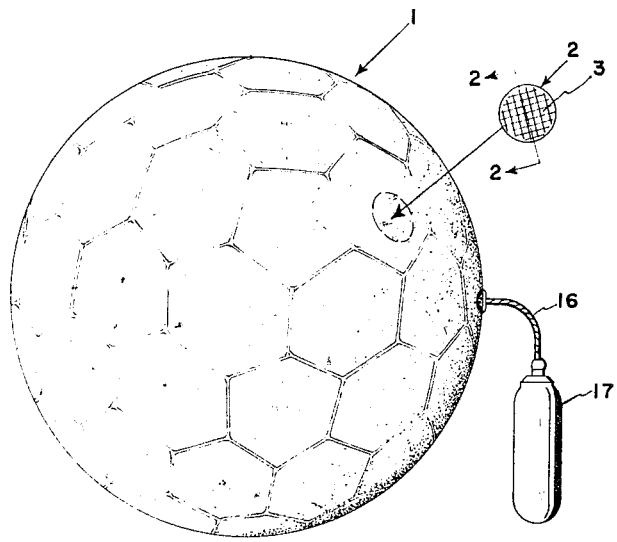
FIGURE 1 is a front elevation of a spherically shaped reflective satellite representing a preferred embodiment of the invention.

With specific reference to the form of the invention illustrated in the drawings, the numeral 1 indicates generally a radar and radio wave reflective satellite having a hollow spherical body formed from a wire mesh 2 adhesively secured to a bladder 3.

Figure 2:
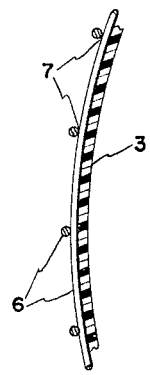
FIGURE 2 is an enlarged fragmentary cross sectional view of the surface of the satellite taken approximately on line 2—2 of FIGURE 1.
Figure 3:
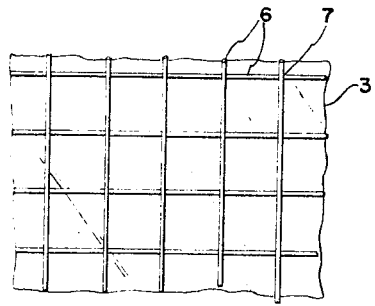
FIGURE 3 is an enlarged fragmentary view of the outer surface of the satellite of FIGURE 1.

The wire mesh and inflatable bladder combination is a feature of the invention and its construction is best seen in FIGURE 2. Normally, the bladder 3 is about ½ mil in thickness and is a special plastic type material which is photolithic, in other words, it decomposes under the influence of the space environment of low pressure, and infrared and ultraviolet radiation. The bladder 3 may be of a film of the methacrylic ester polymer type. When these are prepared by free radical polymerization, they have a chemical structure with identical initiating and terminal radicals. Polymers thus constituted will be flexible and optically clear, and their deployment can be by any of the conventional techniques, such as by melt or by solution. However, when exposed to ultraviolet light, they decompose to monomer form, which departs by evaporation.

The wires 6 of the wire mesh are usually between about 1 and about 10 mils in diameter, dependent upon the size of the satellite. In a satellite with a diameter of several hundred feet the wires are about 2 mils in diameter, and can be made of any metallic wire that will as a mesh reflect radiant wave electrical energy, which metal can easily be drawn to a very small diameter, and which metal has an extended elongation range between the elastic limit and the breaking or ultimate strength value. Usually, however, an almost pure aluminum wire is used because of the added feature of lightness in weight for the rigidity provided.

Figure 4:
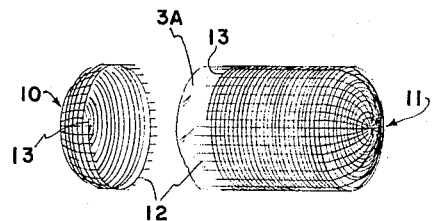
FIGURE 4 is a perspective view of a cylindrically shaped satellite incorporating the features of the preferred embodiment of the invention.

It is an important feature of the invention that the wires form a crisscrossing pattern and be of preconceived diameter and spacing whereby the same stress level will occur in all the wires upon inflation of the bladder. A simple mathematical analysis will show that for a cylindrical shape the spacing between the longitudinally extending wires must be twice that between the circumferentially extending wires, assuming that the wires are of the same diameter and yield strength. Similar analysis can be made for other uniform geometric shapes to determine the proper wire spacing to achieve a uniform stress level over the entire surface upon inflation and stretching of the wires. Of course, if the stress level is not the same it will result in great distortion of the finally desired shape. Therefore, it becomes a matter of critical importance to meet the uniform overall stress requirement. In lieu of a variation in the crisscrossed wire spacing the yield strengths of the wires might be varied either by changing the wire diameter or the wire material. Thus, for example, one could use aluminum wires in one direction and steel wires in the other. FIGURE 4 illustrates a cylindrical shape where the wire spacing is as described above, while FIGURE 5 illustrates a conical shape where the wire spacing is actually variable from the base to the apex in both the longitudinal and circumferential directions.

There are several ways that the wire mesh 2 may be incorporated with the bladder 3. In one form, the wire mesh pattern is woven on top of the bladder material by a machine while an elongated flat strip of material is fed into the stream. The wires are adhesively secured to the bladder by a suitable adhesive, for example, by either coating the wires or the bladder before they are brought together. Also, the wires 6 of the mesh are adhesively secured, brazed, or welded to each other at their points of contact 7.

Figure 5:
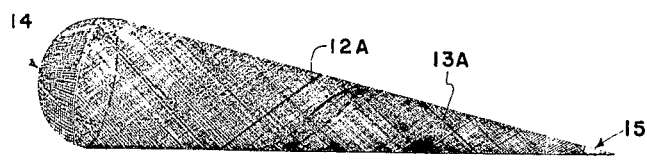
FIGURE 5 is a perspective view of a conically shaped satellite incorporating the features of the preferred embodiment of the invention.

However, the incorporation of the foregoing technique cannot conveniently be utilized to make the cylindrical and conical shapes of FIGURES 4 and 5. Specifically, if the material is made flat, it cannot be conveniently put together into the cylindrical shape or conical shape of FIGURES 4 and 5 without making a plurality of seams which tend to create an unbalance in the resultant satellite, as well as being difficult to form and maintain electrical continuity. Further, any inaccuracy in a longitudinal seam or circumferential splice will tend to put a local bend in the tube.

Thus, with reference to FIGURE 4, a cylindrically shaped bladder 3A is provided with the normal mesh pattern with proper spacing woven on each of the ends 10 and 11. A plurality of longitudinally extending equally spaced wires 12 are then carefully placed or wound parallel to the longitudinal axis of the bladder, and preferably adhesively secured to the bladder 3A. Then, in order to achieve the mesh type configuration necessary for reflective qualities, and yet to make the satellite seamless, one long wire indicated generally by numeral 13 is wrapped circumferentially around the bladder over the longitudinally extending wires 12 in equally spaced very slight helical convolutions along the entire length of the bladder. The very slight inclination of the helical wind does not effect the mesh pattern sufficiently to deteriorate any of its desired electrical reflective qualities. The wrapping of the circumferential wire 13 may be achieved by rotating the bladder on its longitudinal axis, or simply running a spinner ring carrying the wire around the bladder to achieve the desired circumferential wrap. Of course, the longitudinal wrap can be achieved by rotating the bladder about a variable central axis perpendicular to the longitudinal axis.

Figure 6:
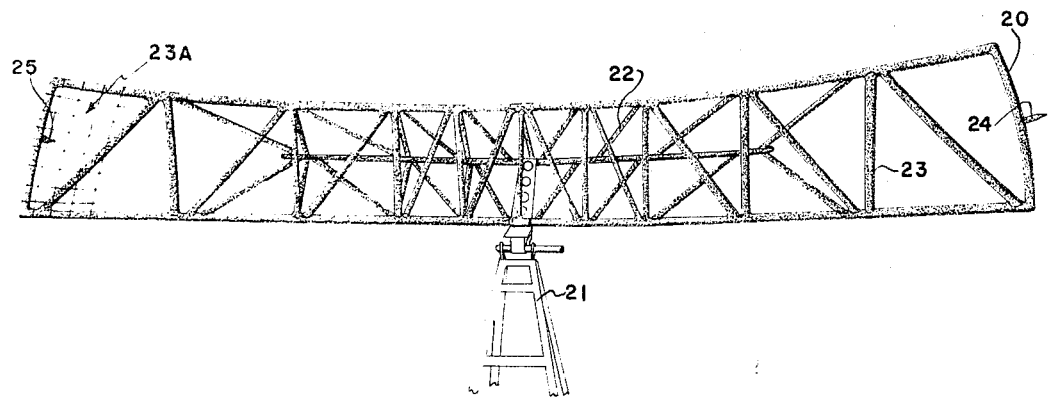
FIGURE 6 is a front elevation of an antenna having a supporting framework made up from a plurality of cylindrical shaped elements and representing a preferred embodiment of the invention.
Figure 7:
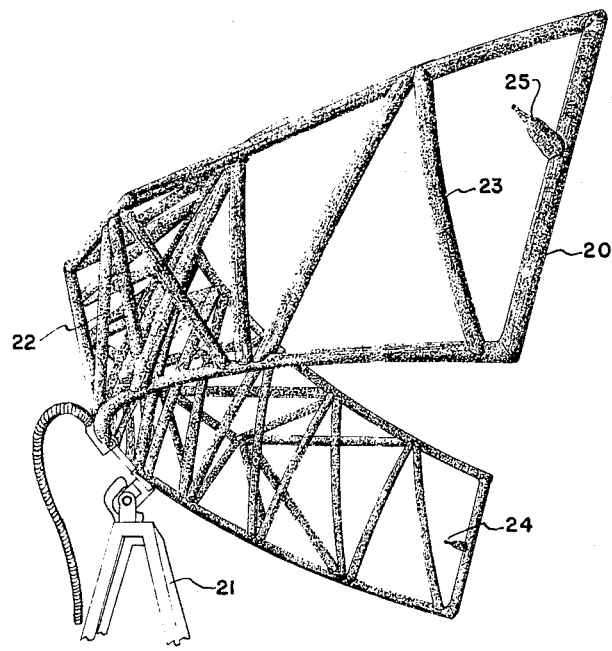
FIGURE 7 is a side elevation of the antenna of FIGURE 6.

FIGURES 6 and 7 illustrate how a plurality of the cylindrical forms of FIGURE 4 may be utilized as structural elements to form a large partial parabolic shaped antenna. This antenna frame consists of an outer framework 20 mounted to a base pedestal 21. Extra strengthening tubular members 22 are mounted behind the central portion to help hold the desired curvature, as best seen in FIGURE 7. A plurality of cross members 23 complete the antenna structure. A wire mesh 23A is attached to the framework 20 to provide the desired reflective surface. The spacing and configuration of the wire mesh 23A controls antenna frequency. Note also the inflation tubes 24 and 25 mounted on each end of the outer framework 20 to provide inflation of the combination. The invention anticipates that each of the tubes used as structural members in this situation will be in fluid communication with the other members at the point of connection, although this is not necessary since it might be divided into fluid tight sections, each being independently inflatable.

Similarly, the conical configuration shown in FIGURE 5 may be made in the same way with a circumferential wrap in equally spaced helical convolutions to also achieve a seamless conical configuration. Here the longitudinally extending wires 12A are tapered toward each other to provide an equal stress relationship and to conform to the conical shape of the satellite. Similar wires and components in FIGURE 5 to those in FIGURE 4 are designated by the same number with a sub letter A. Naturally, in FIGURE 5 only one end 14 is necessary, and this is made preferably in the same manner as taught for the spherical configuration shown in FIGURE 1, and described more fully below. The conical embodiment of FIGURE 5 is of particular importance since if its apex 15 is pointed towards the earth's surface, the satellite becomes virtually undetectable by ground based radar, since it will simply act to disperse the impinging radar signals, and not to reflect them. Thus, this particular satellite configuration could carry active detection equipment or other type payload, and be undetectable by conventional radar systems attempting to determine if it is passing over particular sections of the earth's terrain. In a military application, this radar transparency is an important asset, particularly in a spy type satellite for use in detecting ground information over particular areas of the earth's terrain without having the inhabitants thereof know the satellite is passing over.

Normally, the spacing of the wires in the respective wire meshes is from about 1/8 inch apart to several inches apart, the distance depending upon the communication frequencies desired in the passive operating mode, or by the strength of the structure necessary to support associated equipment. It will be recognized that the more closely the mesh is spaced, and/or the larger the wire diameter, the more rigid is the satellite. Increasing the wire diameter increases the rigidity at a much faster rate than the weight increases and is the preferred approach to increase rigidity until limited by the wave frequency requirements. Preferably, the spacing between the wires of the mesh is made less than the wave length of the high frequency waves to be reflected. Usually the spacing between the mesh is between 1/4 and about 1/20 of the wave length to be reflected. In any event, the result is, upon inflation of the spherical mesh in space with the attendant stretching and cold working of the wires, that a very light yet sturdy satellite is produced.

One method of inflating the satellite in space is to place inside the bladder during the building operation a quantity of inflating agents such as subliming powder or water. When in the vacuum of space, the entrapped agents act to inflate the collapsed satellite to shape. Typically a subliming powder such as anthraquinone is employed and in a quantity to fill the volume when vaporized.

In an alternative but heavier arrangement, an umbilical tube 16 may be built into the one end of the bladder. If the bladder is to be inflated by external means, such as a compressed gas tank 17, the connecting tube is a flexible hose. If explosive inflating means are positioned internally of a bladder the tube is replaced by an electrical lead for firing the internal inflating means upon the discharge of the satellite from the rocket carrier.

After the mesh and bladder combination is constructed and tested for air tightness, it is collapsed and carefully packaged and placed aboard a rocket as a payload to be placed into orbit. When the package is released while on an orbital path internal pressure is applied, in a prescribed quantity, by any of the means heretofore described. This pressure is preferably in an amount to inflate the satellite to a greater size than that in which it was built, and enough to stretch the wires of the wire mesh beyond their elastic limit, but less than their breaking point, thereby permanently taking all kinks or bends out of the wire which may have resulted from the collapsing thereof and making the satellite rigid and insuring that it will retain its desired shape.

In the preferred embodiment, the bladder will then decompose leaving only the wire mesh reflector orbiting the earth. This reflector will, therefore, have much better reflective qualities, a longer orbital life, greater rigidity, and will not be subject to solar pressure because its surface area has been so greatly decreased and because there is no gas internally of the satellite. It is also to be understood that the satellite can take a number of different shapes other than those illustrated in order to perform the communication function, or radar transparent function, as selectively desired.

If the satellite of the invention is inflated into space with an external tank or by an explosive charge a part of the inventive concept is to materially speed the decomposition of the bladder by incorporating with the inflating gas materials which will attack the bladder film but which will have little or no effect on the wire mesh. In this case the bladder film may be of the polyester type sold under the trademark "Mylar" by E. I. du Pont de Nemours & Company, of Wilmington, Del. The inflating gas may be carbon dioxide. Mixed with the $CO_2$ is about $\frac{1}{20}$ of an ounce of an amine hydrochloride for each cubic foot of unconfined gas. When this medium is used in space to inflate the bladder the desired inflating and wire stretching action is achieved very rapidly with the bladder remaining air tight, but after a few minutes the bladder begins to decompose and disappear under the action of the amine hydrochloride to thereby achieve the elimination of the bladder.

While in accordance with the patent statutes one best known embodiment of the invention has been illustrated and described in detail, it is to be particularly understood that the invention is not limited thereto or thereby, but that the inventive scope is defined in the appended claims.

What is claimed is:
1. In an inflatable satellite the combination of
an elongated geometrically shaped inflatable bladder having an axis,
a plurality of electrically conductive wires equally spaced around the outside of the bladder and secured thereto in aligned relation to the axis of the bladder when inflated, and
a single electrically conductive wire wrapped in equally spaced helical convolutions around the bladder so as to be substantially in crisscrossed relation to the plurality of aligned wires, and bonded to said wires at points of intersection whereby the wires are stretched to a cold worked state beyond their elastic limit but not beyond their ultimate strength upon the inflation of the bladder to a slightly enlarged form of its geometric shape.

2. A satellite according to claim 1 where the bladder is made from a photolyzable material so as to decompose in a space environment.

3. A satellite according to claim 1 where the wires are made of aluminum and spaced from about $\frac{1}{4}$ to about $\frac{1}{20}$ of a desired reflective wave length apart depending upon the satellite size and desired rigidity requirements.

4. An inflatable satellite according to claim 1 where the bladder is small and substantially cylindrically shaped and where a plurality of such small substantially cylindrically shaped bladders covered with a wire mesh without seams are joined end to end in communication to form a framework shaped as a large antenna, and including means to inflate the entire bladder combination.

5. An inflatable satellite according to claim 4 where the bladder combination is divided into at least two separate fluid tight compartments with separate means to provide inflation to each of the compartments.

6. An inflatable satellite according to claim 4 where the antenna is shaped as a section of a paraboloid.

7. A satellite according to claim 4 where the bladder is made from a photolyzable material so as to decompose in a space environment.

8. A satellite according to claim 1 where the bladder is shaped like a cone.

9. A satellite according to claim 1 where the spacing between the crisscrossed wires is predetermined and dependent on the geometric configuration of the satellite whereby there will be equal stress loads on all wires over the entire surface of the satellite when the bladder is inflated to stretch the wires beyond their elastic limits.

References Cited

UNITED STATES PATENTS

| | | | |
|---|---|---|---|
| 3,224,000 | 12/1965 | Bloetscher et al. | 343—18 |
| 3,274,596 | 9/1966 | Raabe | 343—18 |

RICHARD A. FARLEY, *Primary Examiner.*
RODNEY D. BENNETT, *Examiner.*
D. C. KAUFMAN, *Assistant Examiner.*